United States Patent
Horie

(10) Patent No.: US 9,582,063 B2
(45) Date of Patent: Feb. 28, 2017

(54) ELECTRONIC APPARATUS AND METHOD THAT CONTROLS COMPONENT POWER GATING DURING BATTERY DISCHARGE-OFF MODE

(71) Applicant: Kabushiki Kaisha Toshiba, Tokyo (JP)

(72) Inventor: Yutaka Horie, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 14/481,468

(22) Filed: Sep. 9, 2014

(65) Prior Publication Data
US 2015/0241937 A1    Aug. 27, 2015

Related U.S. Application Data

(60) Provisional application No. 61/944,940, filed on Feb. 26, 2014.

(51) Int. Cl.
*G06F 1/26* (2006.01)
*G06F 1/32* (2006.01)
*H02J 7/00* (2006.01)

(52) U.S. Cl.
CPC ............ *G06F 1/3212* (2013.01); *G06F 1/263* (2013.01); *H02J 2007/004* (2013.01)

(58) Field of Classification Search
CPC ............... H01M 2010/4271; H02J 2007/0067
See application file for complete search history.

(56) References Cited

U.S. PATENT DOCUMENTS

| 2011/0106330 A1* | 5/2011 | Lickfelt | B60L 1/00 |
| | | | 700/297 |
| 2013/0221928 A1* | 8/2013 | Kelty | B60L 11/187 |
| | | | 320/134 |
| 2015/0191098 A1* | 7/2015 | Chang | B60L 11/1862 |
| | | | 701/22 |

FOREIGN PATENT DOCUMENTS

| JP | 2008-092710 | 4/2008 |
| JP | 2010-051080 | 3/2010 |
| JP | 2011-249237 | 12/2011 |
| JP | 2013-005561 | 1/2013 |

* cited by examiner

*Primary Examiner* — Albert Wang
(74) *Attorney, Agent, or Firm* — Rutan & Tucker, LLP

(57) ABSTRACT

According to one embodiment, the first path is configured to continuously supply power from a battery to a first component to which power needs to be continuously supplied. A second path is configured to supply the power from the battery to a second component other than the first component. A setting module is configured to set an operation mode of the battery to a discharge-off mode. A determination module is configured to determine whether a state of the battery satisfies a predetermined condition when the operation mode of the battery is set to the discharge-off mode. A controller is configured to shut off the second path when the determination module determines that the condition is satisfied.

10 Claims, 8 Drawing Sheets

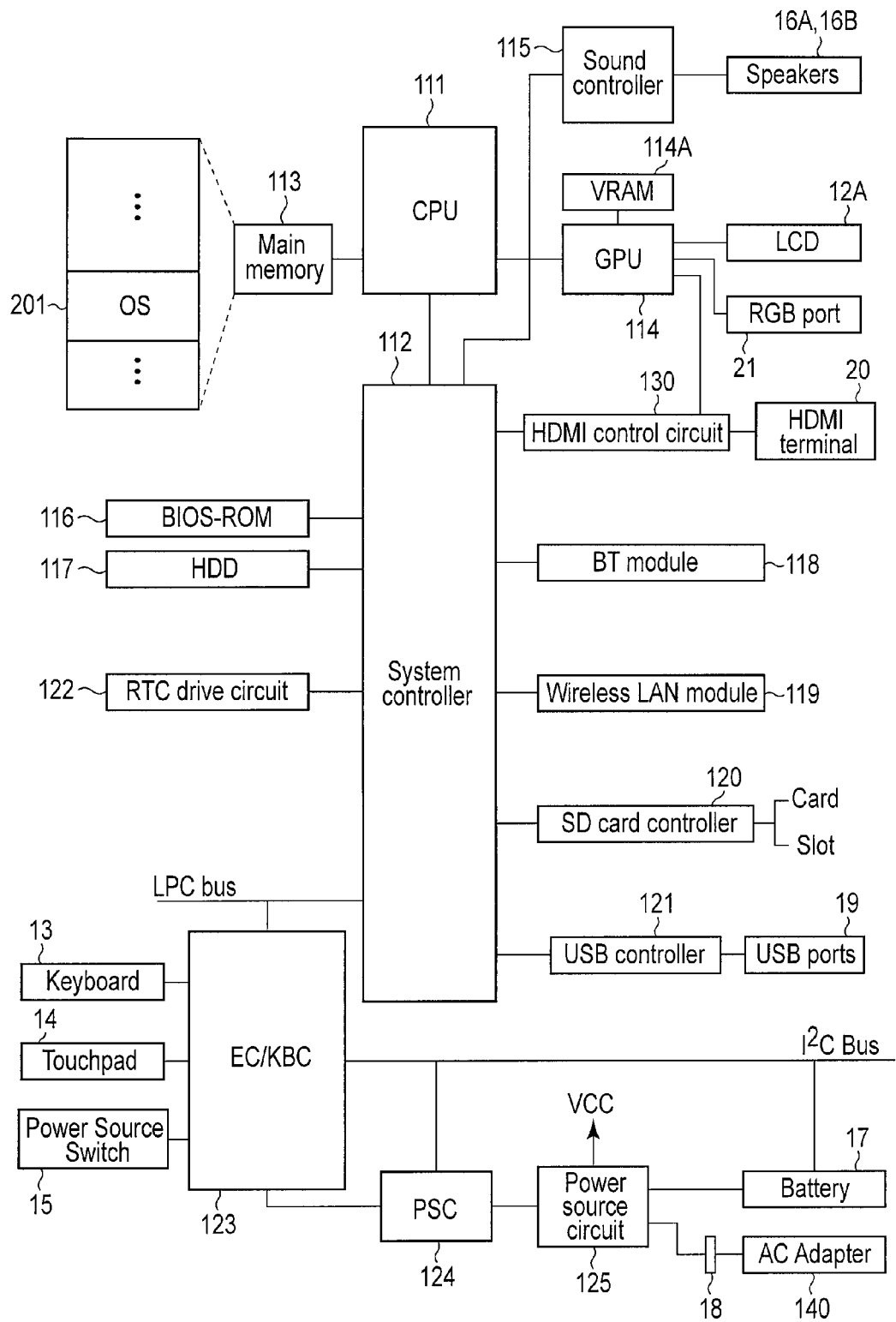
F I G. 2

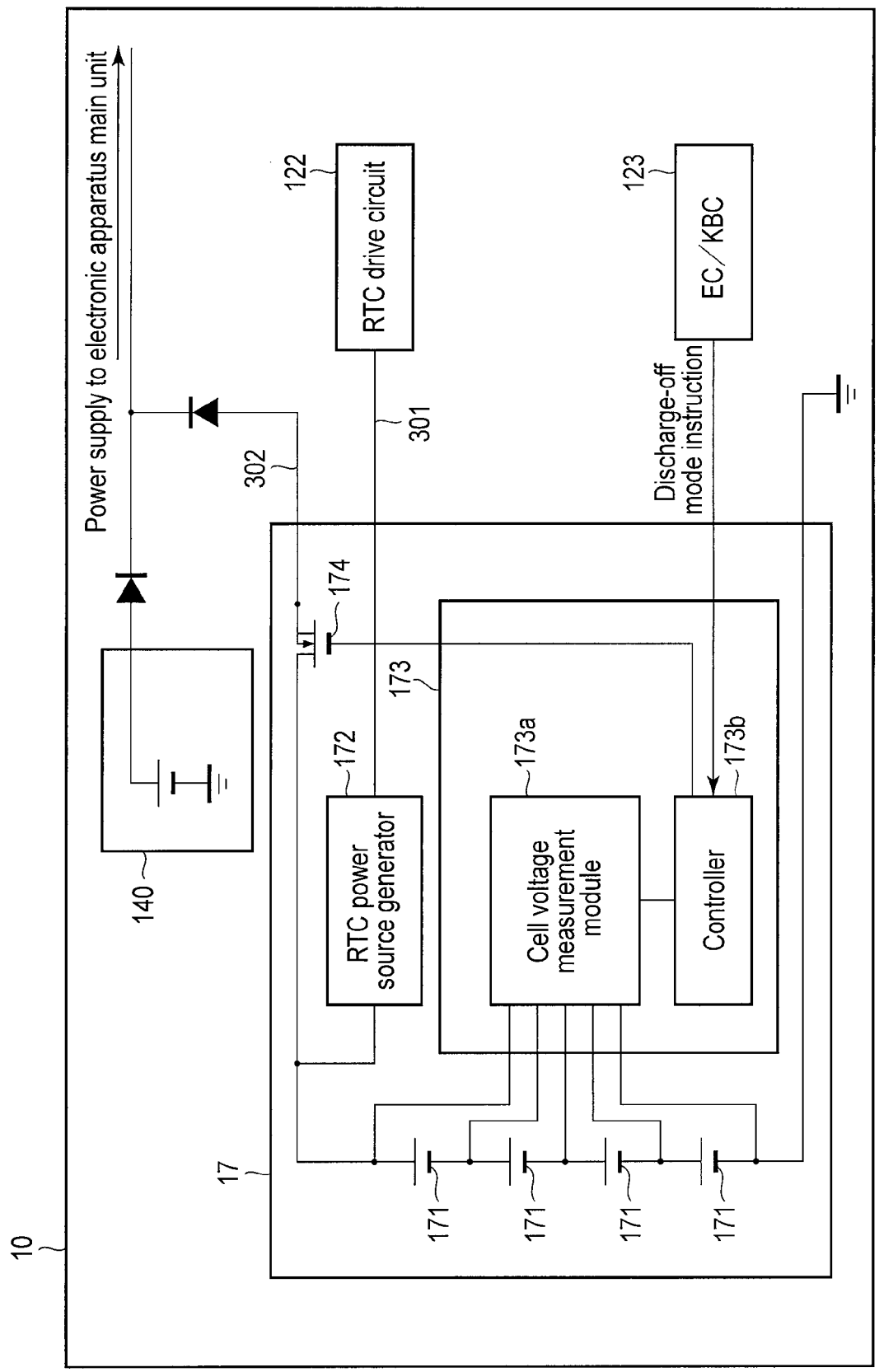
F I G. 3

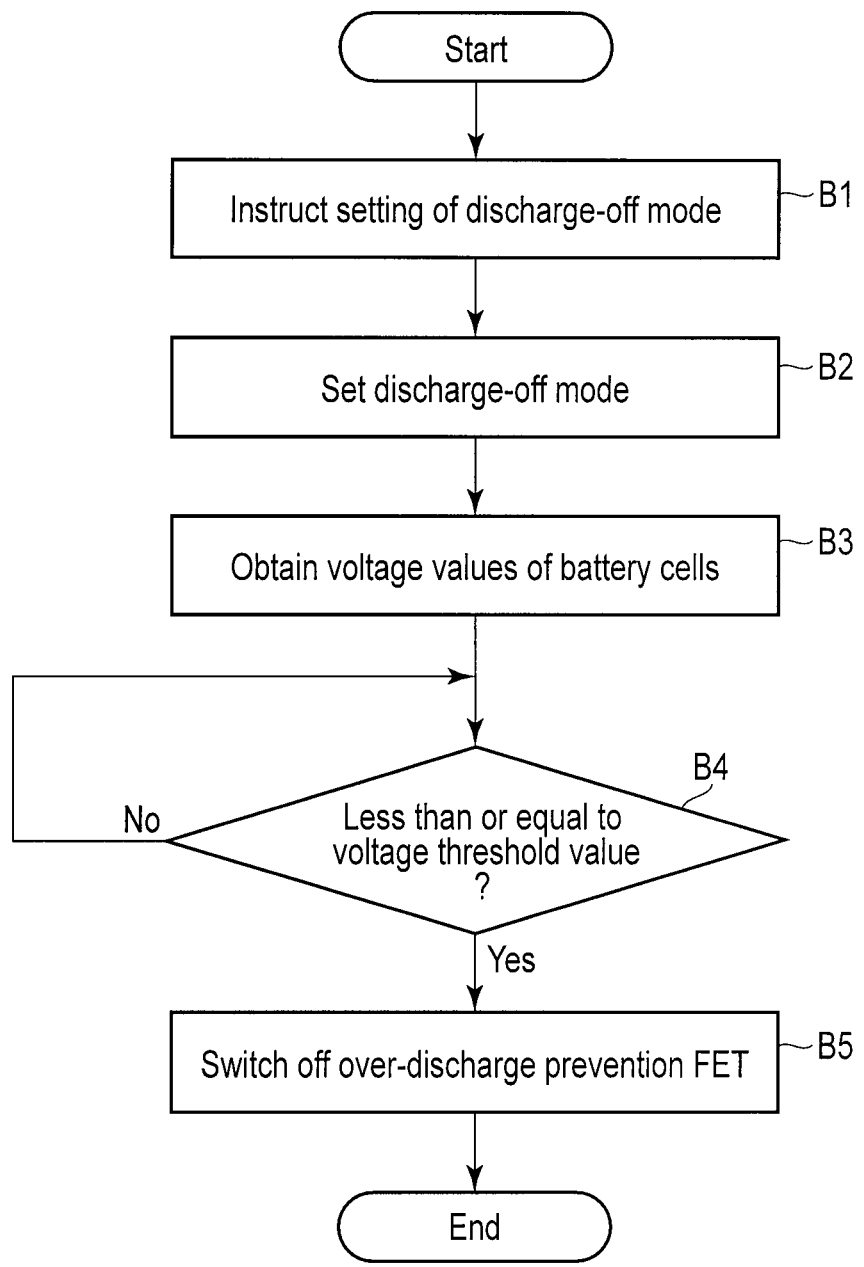
F I G. 4

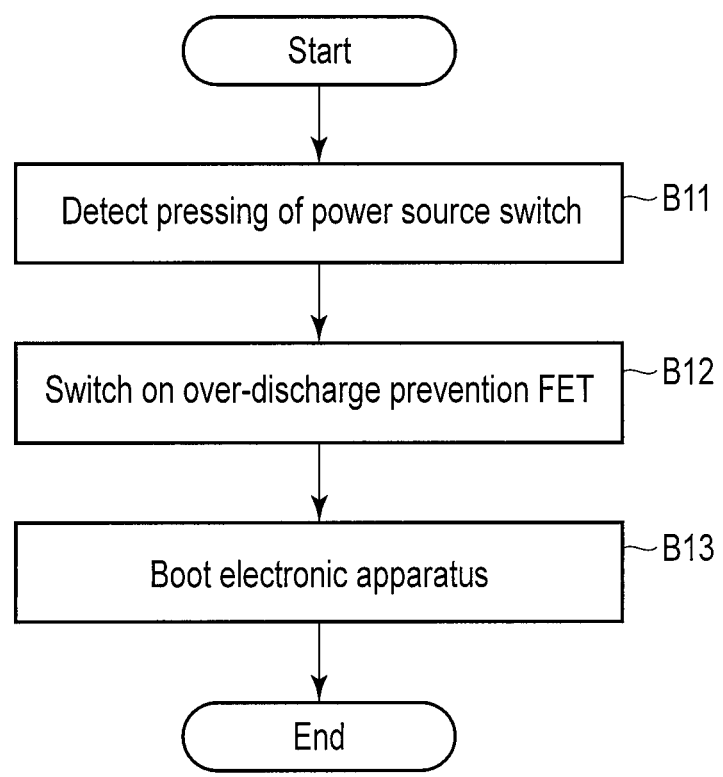
F I G. 6

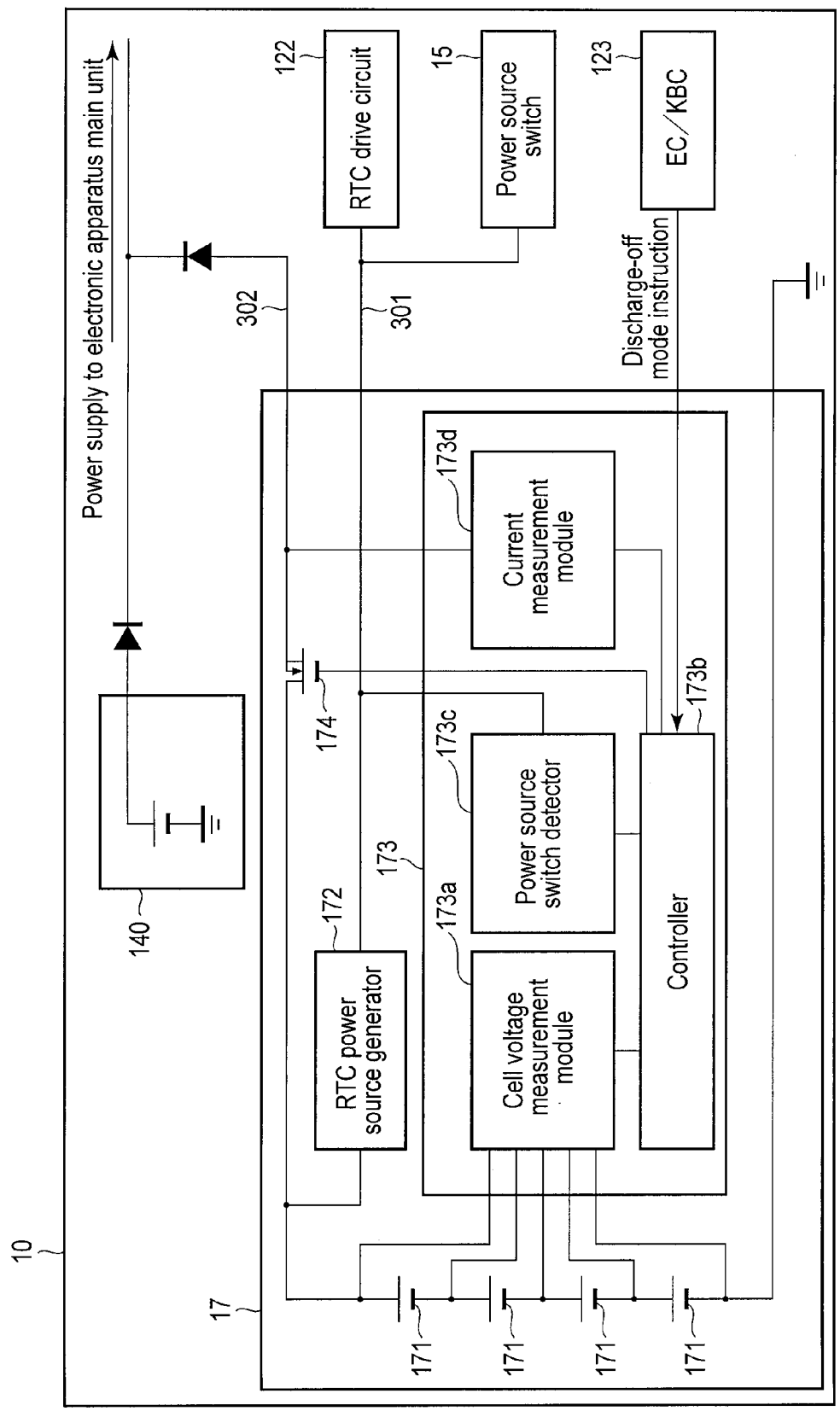
F I G. 8

ELECTRONIC APPARATUS AND METHOD THAT CONTROLS COMPONENT POWER GATING DURING BATTERY DISCHARGE-OFF MODE

CROSS-REFERENCE TO RELATED APPLICATIONS

This application claims the benefit of U.S. Provisional Application No. 61/944,940, filed Feb. 26, 2014, the entire contents of which are incorporated herein by reference.

FIELD

Embodiments described herein relate generally to an electronic apparatus and a method.

BACKGROUND

In recent years, various types of electronic apparatuses have been developed such as notebook personal computers (PC) and tablet computers.

In these electronic apparatuses, even when an electronic apparatus is switched off, power is supplied to the power source circuit (for example, EC/KBC) inside the electronic apparatus.

When the product is shipped, power consumption may be reduced by, for example, setting the operation mode of the battery to a discharge-off mode and shutting off the power supply path (power source path) from the battery to the electronic apparatus.

However, in general, in many cases, the battery is fully charged when it is shipped. Therefore, if the operation mode of the battery is set to a discharge-off mode in shipping the product, the battery is left for a long time in the full-charge state. This situation could promote the deterioration of the battery.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a diagram showing an example of a system structure of the electronic apparatus 10 shown in FIG. 1.

FIG. 3 is a diagram for explaining an example of a structure of a battery 17.

FIG. 4 is a flowchart showing an example of steps of a process of setting an operation mode of the battery 17 to a discharge-off mode.

FIG. 6 is a flowchart showing an example of steps of a process of booting the electronic apparatus 10 after the operation mode of the battery 17 is set to the discharge-off mode.

FIG. 8 is a diagram for explaining an example of a structure of the battery 17 in a case where a gas gage IC 173 includes a current measurement module 173d.

DETAILED DESCRIPTION

Various embodiments will be described hereinafter with reference to the accompanying drawings.

In general, according to one embodiment, an electronic apparatus includes a battery for supplying power, a first path, a second path, a setting module, a determination module and a controller. The first path is configured to continuously supply power from the battery to a first component to which power needs to be continuously supplied among components constituting the electronic apparatus. The second path is configured to supply the power from the battery to a second component other than the first component among the components constituting the electronic apparatus. The setting module is configured to set an operation mode of the battery to a discharge-off mode. The determination module is configured to determine whether a state of the battery satisfies a predetermined condition when the operation mode of the battery is set to the discharge-off mode. The controller is configured to shut off the second path when the determination module determines that the condition is satisfied.

First Embodiment

Figure 1:
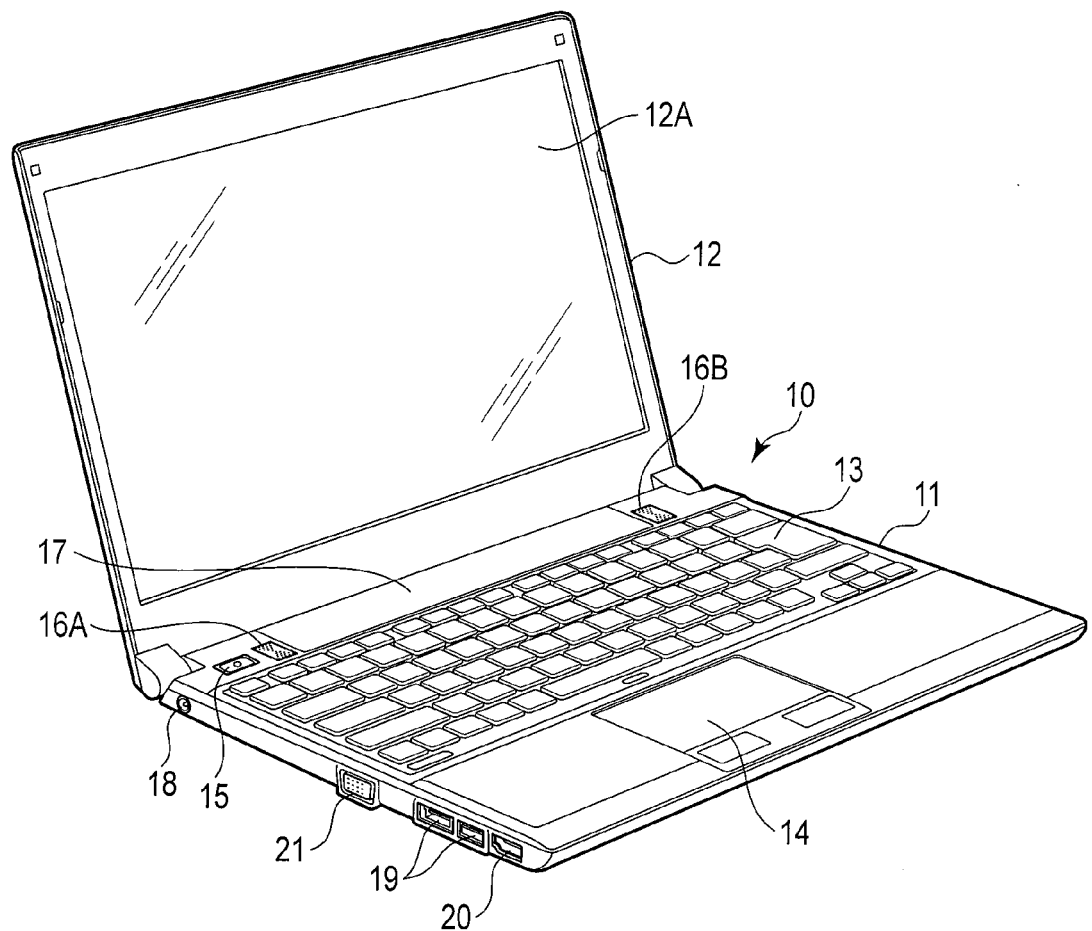
FIG. 1 is a perspective illustration showing an example of an appearance of an electronic apparatus according to a first embodiment.

First, this specification explains a structure of an electronic apparatus according to a first embodiment. FIG. 1 is a perspective illustration showing the appearance of the electronic apparatus according to this embodiment. This electronic apparatus could be realized as various types of electronic apparatuses such as notebook personal computers and tablet computers. Hereinafter, this specification assumes that the electronic apparatus is implemented as, for example, a notebook personal computer (PC).

As shown in FIG. 1, an electronic apparatus 10 includes an electronic apparatus main unit (computer main unit) 11 and a display unit 12. A display device such as a liquid-crystal display (LCD) device 12A is incorporated in the display unit 12.

The display unit 12 is attached to the electronic apparatus main unit 11 in a manner that the display unit 12 can rotate between an opened position at which the upper surface of the electronic apparatus main unit 11 is exposed and a closed position at which the upper surface of the electronic apparatus main unit 11 is covered by the display unit 12. The electronic apparatus main unit 11 includes a housing having a thin box shape. A keyboard 13, a touchpad 14, a power source switch 15 for switching on/off the power source of the electronic apparatus 10 and speakers 16A and 16B are provided on the upper surface of the electronic apparatus main unit 11.

The electronic apparatus 10 is configured to receive power from a battery 17. In this embodiment, the battery 17 is accommodated in the electronic apparatus 10.

Further, in the electronic apparatus main unit 11, a power source connector (DC power source input terminal) 18 is provided. The power source connector 18 is provided on a side surface of the electronic apparatus main unit 11; for example, on the left side surface. An external power source device is detachably connected to the power source connector 18. As the external power source device, an AC adapter can be used. The AC adapter is a power source device which converts a commercial power source (AC power) to DC power.

The electronic apparatus 10 is driven by the power supplied from the battery 17 or the power supplied from an external power source device. In a case where an external power source device is not connected to the power source connector 18 of the electronic apparatus 10, the electronic apparatus 10 is driven by the power supplied from the battery 17. On the other hand, in a case where an external power source device is connected to the power source connector 18 of the electronic apparatus 10, the electronic apparatus 10 is driven by the power supplied from the external power source device. The power supplied from the external power source device is also used for charging the battery 17.

Some USB ports 19, a High-definition Multimedia Interface (HDMI) (registered trademark) output terminal 20 and an RGB port 21 are provided in the electronic apparatus main unit 11.

FIG. 2 shows a system structure of the electronic apparatus 10 shown in FIG. 1. The electronic apparatus 10 includes a CPU 111, a system controller 112, a main memory 113, a graphics processing unit (GPU) 114, a sound controller 115, a BIOS-ROM 116, a hard disk drive (HDD) 117, a Bluetooth (BT) (registered trademark) module 118, a wireless LAN module 119, an SD card controller 120, a USB controller 121, a real-time clock (RTC) drive circuit 122, an embedded controller/keyboard controller IC (EC/KBC) 123, a power source controller (PSC) 124 and a power source circuit 125, etc.

The CPU 111 is a processor configured to control the operation of each component of the electronic apparatus 10. The CPU 111 executes various types of software loaded from the HDD 117 into the main memory 113. The software includes an operating system (OS) 201, etc.

The CPU 111 also executes a basic input/output system (BIOS) stored in the BIOS-ROM 116 which is a nonvolatile memory. The BIOS is a system program for hardware control.

The system controller 112 is a bridge device configured to connect the CPU 111 and each component. A serial ATA controller for controlling the HDD 117 is incorporated in the system controller 112. Further, the system controller 112 executes the communication with each device on a Low Pin Count (LPC) bus.

The GPU 114 is a display controller configured to control the LCD 12A used as the display monitor of the electronic apparatus 10. The GPU 114 generates a display signal (LVDS signal) which should be supplied to the LCD 12A from the display data stored in a video memory (VRAM) 114A.

Further, the GPU 114 can generate an HDMI video signal and an analogue RGB signal from the display data. The HDMI output terminal 20 can send an HDMI video signal (uncompressed digital video signal) and a digital audio signal to an external display by one cable. The analogue RGB signal is supplied to an external display through the RGB port 21.

An HDMI control circuit 130 shown in FIG. 2 is an interface configured to send an HDMI video signal and a digital audio signal to an external display through the HDMI output terminal 20.

The sound controller 115 is a sound source device, and outputs the audio data to be reproduced to, for example, the speakers 16A and 163.

The BT module 118 is a module configured to execute wireless communication with a Bluetooth-compatible device by using the Bluetooth.

The wireless LAN module 119 is a module configured to execute the wireless communication of, for example, IEEE 802.11 standard.

The card controller 120 writes and reads data relative to the memory card inserted into the card slot provided in the electronic apparatus main unit 11.

The USB controller 121 executes the communication with the external device connected through the USB port 19.

The RTC drive circuit 122 is a circuit configured to drive a real-time clock having a timekeeping (horologe) function. According to this real-time clock, timing information can be provided. The RTC drive circuit 122 (real-time clock) may be driven by a different battery from the battery 17 which supplies power to the electronic apparatus main unit 11 (system main unit). However, in this embodiment, power shall be supplied to the RTC drive circuit 122 from the battery 17 (accommodated in the electronic apparatus 10) which supplies power to the electronic apparatus main unit 11.

The EC/KBC 123 is connected to an LPC bus. Further, the EC/KBC 123 is mutually connected with the PSC 124 and the battery 17 via a serial bus such as an $I^2C$ bus.

The EC/KBC 123 is a power management controller configured to execute the power management of the electronic apparatus 10. The EC/KBC 123 is realized as, for example, a one-chip microcomputer incorporating a keyboard controller controlling the keyboard (KB) 13 and the touchpad 14, etc. The EC/KBC 123 has a function of powering on and off the electronic apparatus 10 in response to a user's operation relative to the power source switch 15. The control to power on and off the electronic apparatus 10 is executed by the conjoint action of the EC/KBC 123 and the PSC 124. When the ON signal transmitted from the EC/KBC 123 is received, the PSC 124 powers on the electronic apparatus 10 by controlling the power source circuit 125. When the OFF signal transmitted from the EC/KBC 123 is received, the PSC 124 powers off the electronic apparatus 10 by controlling the power source circuit 125.

The power source circuit 125 generates the power (operation power Vcc) which should be supplied to each component by using the power supplied from the battery 17 or the power supplied from an AC adapter 140 connected to the electronic apparatus main unit 11 as an external power source device.

The EC/KBC 123 (the PSC 124 and the power source circuit 125) needs to execute the control of powering on the electronic apparatus 10 as described above even while the electronic apparatus 10 is powered off. Therefore, even while the electronic apparatus 10 is powered off, power is supplied to the EC/KBC 123, etc., from the battery 17 (or the AC adapter 140).

On the other hand, for example, although the electronic apparatus 10 is powered off and shut down when it is shipped, etc., the above-described EC/KBC 123, etc., consumes power even in the powered-off state. In order to avoid this power consumption, the electronic apparatus 10 shall cause the battery 17 to operate with a mode for stopping the power supply from the battery 17 (hereinafter, referred to as a discharge-off mode) when the electronic apparatus 10 is shipped, etc. The setting of the discharge-off mode is reported to the EC/KBC 123 by a dedicated application program (hereinafter, referred to as a discharge-off mode setting application) which operates on the electronic apparatus 10 when the inspection is completed before the electronic apparatus 10 is shipped, etc. The instruction of the setting of the discharge-off mode is sent from the EC/KBC 123 to the battery 17.

FIG. 3 is a diagram for explaining an example of a structure of the battery 17. In this embodiment, as the power supply path from the battery 17, an auxiliary power source path 301 (first path) and a main power source path 302 (second path) are provided. The auxiliary power source path 301 is a path configured to supply power to, for example, the RTC drive circuit 122 (first component) to which power needs to be continuously supplied among the components constituting the electronic apparatus 10. (In other words, the auxiliary power source path 301 is a path dedicated to the RTC drive circuit 122.) On the other hand, the main power source path 302 is a path configured to supply power to the electronic apparatus main unit 11 including, for example, the EC/KBC 123 (second component) except the RTC drive circuit 122 among the components constituting the electronic apparatus 10. In the state where the electronic apparatus 10 is powered off and shut down, the current supplied from the path to the electronic apparatus main unit 11 is, for example, 2 to 3 mA.

As shown in FIG. 3, the battery 17 comprises a plurality of battery cells 171 connected in series. The battery 17 includes an RTC power source generator 172, a gas gage IC 173 and an over-discharge prevention FET 174.

The RTC power source generator 172 is configured to generate the power (power source) supplied to the RTC drive circuit 122. The RTC power source generator 172 supplies appropriate power to the RTC drive circuit 122 by converting the voltage obtained from the plurality of battery cells 171. The power is supplied to the RTC drive circuit 122 via the above-described auxiliary power source path 301. The power is continuously supplied to the RTC drive circuit 122 regardless of the setting or cancelling the discharge-off mode described later. The amount of power (power consumption) supplied to the RTC drive circuit 122 is very small. Thus, the influence on the remaining capacity of the battery 17 shall be small. The current supplied to the RTC drive circuit 122 is, for example, less than or equal to 10 µA.

The gas gage IC 173 is a mechanism for estimating the remaining capacity (charging rate) in the battery 17, and includes a cell voltage measurement module 173a and a controller 173b.

The cell voltage measurement module 173a is a module configured to measure the voltage value of each of the battery cells 171 provided in the battery 17. The voltage value (cell voltage) of each battery cell 171 measured by the cell voltage measurement module 173a is reported to the controller 173b.

When the setting of the above-described discharge-off mode (discharge-off mode instruction) is ordered by the EC/KBC 123, the controller 173b determines whether or not the state of the battery 17 satisfies the predetermined condition. In this case, for example, the controller 173b determines that the condition is satisfied when at least one of the voltage values of the battery cells 171 measured by the cell voltage measurement module 173a is less than or equal to the predetermined value (hereinafter, referred to as a voltage threshold value). The voltage threshold value (discharge-off mode transition permission voltage value) is retained in advance inside the controller 173b. The controller 173b is configured to turn the over-discharge prevention FET 174 on and off. When the controller 173b determines that the above-described condition is satisfied, the controller 173b executes the process of switching off the over-discharge prevention FET. On the other hand, when the controller 173b determines that the condition is not satisfied, the controller 173b maintains the switched-on state of the over-discharge prevention FET.

The over-discharge prevention FET 174 is a field-effect transistor for preventing over-discharge in the battery 17, and is provided in the aforementioned main power source path 302. When the over-discharge prevention FET 174 is switched on, power is supplied from the battery 17 to the electronic apparatus main unit 11 including the EC/KBC 123 via the main power source path 302. On the other hand, when the over-discharge prevention FET 174 is switched off, the main power source path 302 is blocked, and power is not supplied from the battery 17 to the electronic apparatus main unit 11.

As shown in FIG. 3, power may be also supplied to the electronic apparatus main unit 11 by means of the AC adapter 140.

Next, this specification explains the steps of the process of setting the operation mode of the battery 17 to the discharge-off mode as described above by reference to the flowchart of FIG. 4.

For example, the discharge-off mode is a mode set to avoid the power consumption by the electronic apparatus main unit 11 (for example, the EC/KBC 123, etc.) when the electronic apparatus 10 is shipped. The battery 17 shall be fully charged when the product is shipped.

Before the discharge-off mode is set, the power generated by the RTC power source generator 172 included in the battery 17 shall be supplied to the RTC drive circuit 122 via the auxiliary power source path 301. Further, the over-discharge prevention FET 174 included in the battery 17 shall be switched on, and power shall be supplied to the electronic apparatus main unit 11 via the main power source path 302.

Here, in a case where the discharge-off mode is set when the inspection is completed before the electronic apparatus 10 is shipped as described above, etc., the notification indicating that the discharge-off mode should be set is reported to the EC/KBC 123 by the operation of the discharge-off mode setting application on the electronic apparatus 10. The EC/KBC 123 instructs the battery 17 (the gas gage IC 173 included in the battery 17) to set the discharge-off mode in accordance with the notification (block B1). After the EC/KBC 123 orders the setting of the discharge-off mode in the shipment of the product, the EC/KBC 123 shall power off the electronic apparatus 10, and then, execute the process relating to the discharge-off mode.

When the setting of the discharge-off mode is ordered by the EC/KBC 123, the controller 173b included in the gas gage IC 173 sets the operation mode of the battery 17 to the discharge-off mode (block B2).

Next, the controller 173b obtains the voltage value of each battery cell 171 measured by the cell voltage measurement module 173a (block B3).

The controller 173b compares the obtained voltage value of each battery cell 171 with the voltage threshold value retained in advance inside the controller 173b. As the voltage threshold value, for example, a value (for example, 4 V) which is equivalent to a state where it is difficult for the battery 17 to deteriorate even if left for a long time is set.

Based on the comparison result, the controller 173b determines whether or not at least one of the obtained voltage values of the battery cells 171 is less than or equal to the voltage threshold value (block B4).

When the controller 173b determines that at least one of the voltage values of the battery cells 171 is less than or equal to the voltage threshold value (YES in block B4), the controller 173b switches off the over-discharge prevention FET 174 (block B5).

When the over-discharge prevention FET 174 is switched off in this manner, the main power source path 302 is blocked, and power supply to the electronic apparatus main unit 11 is stopped.

In this embodiment, the path (the auxiliary power source path 301) dedicated to the RTC drive circuit 122 is provided, separately from the main power source path 302. Therefore, as described above, even in a case where the over-discharge prevention FET 174 is switched off, power supply to the RTC drive circuit 122 is continued.

On the other hand, when the controller 173*b* determines that none of the voltage values of the battery cells 171 is less than or equal to the voltage threshold value (NO in block B4), the step of block B4 is repeated. Thus, the switched-on state of the over-discharge prevention FET 174 is maintained, and power supply to the electronic apparatus main unit 11 is continued until at least one of the voltage values of the battery cells 171 becomes less than or equal to the voltage threshold value.

In the above explanation, the over-discharge prevention FET 174 is switched off when at least one of the voltage values of the battery cells 171 is less than or equal to the voltage threshold value. However, the over-discharge prevention FET 174 may be configured to be switched off when all of the voltage values of the battery cells 171 are less than or equal to the voltage threshold value.

Further, in the above descriptions, this specification explains that the voltage values of the battery cells 171 are used. However, for example, the over-discharge prevention FET 174 may be configured to be switched off when the remaining capacity (charging rate) of the battery 17 estimated in the gas gage IC 173 is less than or equal to the predetermined value (for example, 80%).

As described above, in a case where the discharge-off mode is set and then, for example, power is supplied from the AC adapter 140 to the electronic apparatus main unit 11 (the EC/KBC 123) and the electronic apparatus 10 is powered on, for example, the EC/KBC 123 can instruct the battery 17 to cancel the discharge-off mode. In this case, the controller 173*b* cancels the setting of the discharge-off mode in the battery 17 and switches on the over-discharge prevention FET 174. According to this structure, the shutoff of the main power source path 302 is cancelled, and power is supplied from the battery 17 to the electronic apparatus main unit 11.

The controller 173*b* shall retain a cutoff voltage value inside. By this structure, even in a case where the operation mode of the battery 17 is not set to the discharge-off mode, the controller 173*b* can switch off the over-discharge prevention FET 174 when the voltage value of each battery cell 171 (or at least one of the voltage values of the battery cells 171) is less than or equal to the cutoff voltage value. As the cutoff voltage value, a value which is lower than the above-described voltage threshold value shall be set.

As explained above, in this embodiment, the auxiliary power source path 301 and the main power source path 302 are provided. In a case where the operation mode of the battery 17 is set to the discharge-off mode, whether or not the state of the battery 17 satisfies the predetermined condition (for example, whether or not the voltage value of each battery cell 171 is less than or equal to the voltage threshold value) is determined. When the state of the battery 17 is determined as satisfying the condition, the main power source path 302 configured to supply power to the electronic apparatus main unit 11 is shut off.

In other words, in this embodiment, even in a case where the operation mode of the battery 17 is set to the discharge-off mode, for example, power is supplied to the electronic apparatus main unit 11 (for example, the EC/KBC 123, etc.) via the main power source path 302 until the voltage value of each battery cell 171 becomes less than or equal to the voltage threshold value.

In this manner, in this embodiment, the main power source path 302 is not blocked until the state (remaining capacity) of the battery 17 becomes a state where it is difficult for the battery 17 to deteriorate even if left for a long time. Therefore, it is possible to avoid a situation where the battery 17 which is fully charged is left for a long time, and thus, the deterioration of the battery can be prevented.

Second Embodiment

Figure 5:
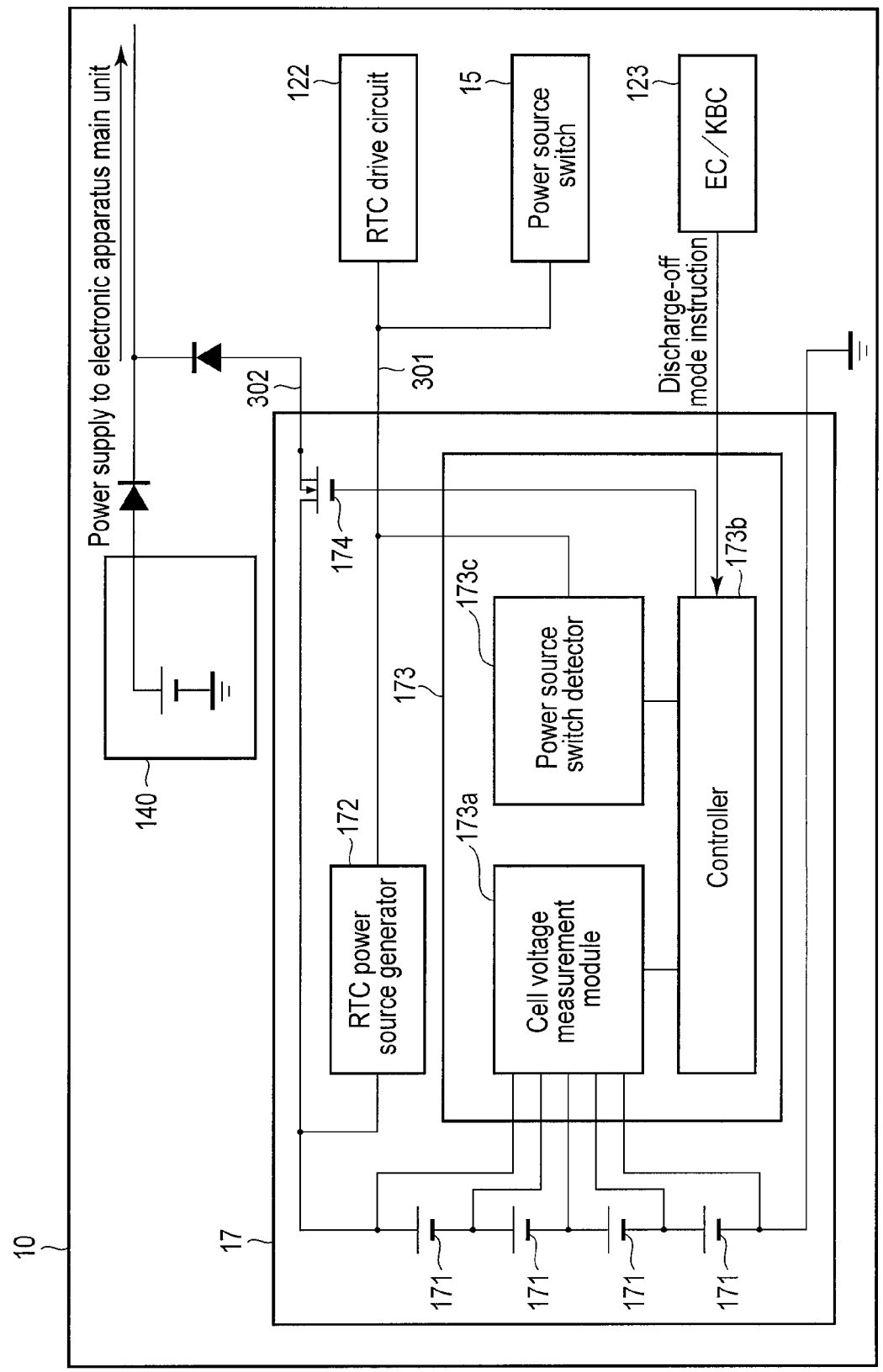
FIG. 5 is a diagram for explaining an example of a structure of a battery in a second embodiment.

Next, a second embodiment is explained by reference to FIG. 5. FIG. 5 is a diagram for explaining an example of a structure of a battery in this embodiment. The detailed explanations of the same structures as the aforementioned FIG. 3 are omitted by adding the same reference symbols to the structures. Here, structures that are different from FIG. 3 are explained.

The appearance and the system structure of the electronic apparatus of this embodiment are the same as the first embodiment. Therefore, the appearance and the system structure are explained by arbitrarily using FIG. 1 and FIG. 2.

In this embodiment, as shown in FIG. 5, a gas gage IC 173 of a battery 17 includes a power source switch detector 173*c*. In this respect, this embodiment is different from the first embodiment. The power source switch detector 173*c* is configured to detect the pressing of a power source switch 15 provided on the upper surface of an electronic apparatus main unit 11 (in short, the instruction to power on an electronic apparatus 10). The power source switch detector 173*c* and the power source switch 15 are connected to an auxiliary power source path 301. In a case where the power source switch detector 173*c* detects the pressing of the power source switch 15, this detection is reported to a controller 173*b*.

In the first embodiment, for example, in a case where the operation mode of the battery 17 is set to the discharge-off mode, and an over-discharge prevention FET 174 is switched off (in short, a main power source path 302 is shut off), the power supply by an AC adapter 140 is required to boot an electronic apparatus 10.

On the other hand, in this embodiment, even in such a case, it is possible to boot the electronic apparatus 10 by the power supply from the battery 17.

Now, this specification explains the steps of the process of booting the electronic apparatus 10 after the operation mode of the battery 17 is set to the discharge-off mode by reference to the flowchart of FIG. 6.

Here, the operation mode of the battery 17 shall be set to the discharge-off mode and the over-charge prevention FET 174 shall be switched off in accordance with the process shown in the aforementioned FIG. 4. Further, power shall be supplied to an RTC drive circuit 122 via the auxiliary power source path 301.

The user of the electronic apparatus 10 can press the power source switch 15 provided on the upper surface of the electronic apparatus main unit 11 for the purpose of powering on the electronic apparatus 10 (booting the electronic apparatus 10). In this manner, the powering on of the electronic apparatus 10 is ordered.

In this case, as shown in the above-described FIG. 5, since the power source switch 15 is connected to the auxiliary power source path 301, the auxiliary power source path 301 becomes low (in other words, the voltage in the auxiliary power source path 301 is reduced) when the power source switch 15 is pressed.

The power source switch detector 173c included in the gas gage IC 173 detects the above-described pressing of the power source switch 15 (in other words, the instruction to power on the electronic apparatus 10) by detecting the reduction (falling edge) in voltage in the auxiliary power source path 301 (block B11).

Next, the power source switch detector 173c notifies the controller 173b that the power source switch 15 is pressed.

After the controller 173b receives the notification from the power source switch detector 173c, the controller 173b cancels the condition (that is, the discharge-off mode) for switching off the over-discharge prevention FET 174 due to the discharge-off mode. According to this structure, even when at least one of the aforementioned voltage values of the battery cells 171 is less than or equal to the voltage threshold value, the over-discharge prevention FET 174 is switched on (block B12).

In a case where, for example, the voltage value of each battery cell 171 is less than or equal to the cutoff voltage value since conditions other than the condition for switching off the over-discharge prevention FET 174 due to the discharge-off mode are not cancelled, the switched-off state of the over-discharge prevention FET 174 is maintained.

When the over-discharge prevention FET 174 is switched on in this manner, the shutoff of the main power source path 302 is cancelled, and power is supplied from the battery 17 to the electronic apparatus main unit 11 (for example, an EC/KBC 123, etc.) via the main power source path 302. Thus, the EC/KBC 123 can operate.

Next, when, for example, the power source switch 15 is pressed again, the EC/KBC 123 powers on the electronic apparatus 10 in response to the operation of the pressing of the power source switch 15. In this manner, the electronic apparatus 10 is booted (block B13).

As described above, in this embodiment, the instruction to power on the electronic apparatus 10 is detected. When the instruction is detected, the shutoff of the main power source path 302 is canceled and the electronic apparatus 10 is powered on. In this embodiment, by this structure, it is possible to power on and boot the electronic apparatus 10 without connecting the AC adapter 140 even in a case where the operation mode of the battery 17 is set to the discharge-off mode and the main power source path 302 is blocked.

Figure 7:
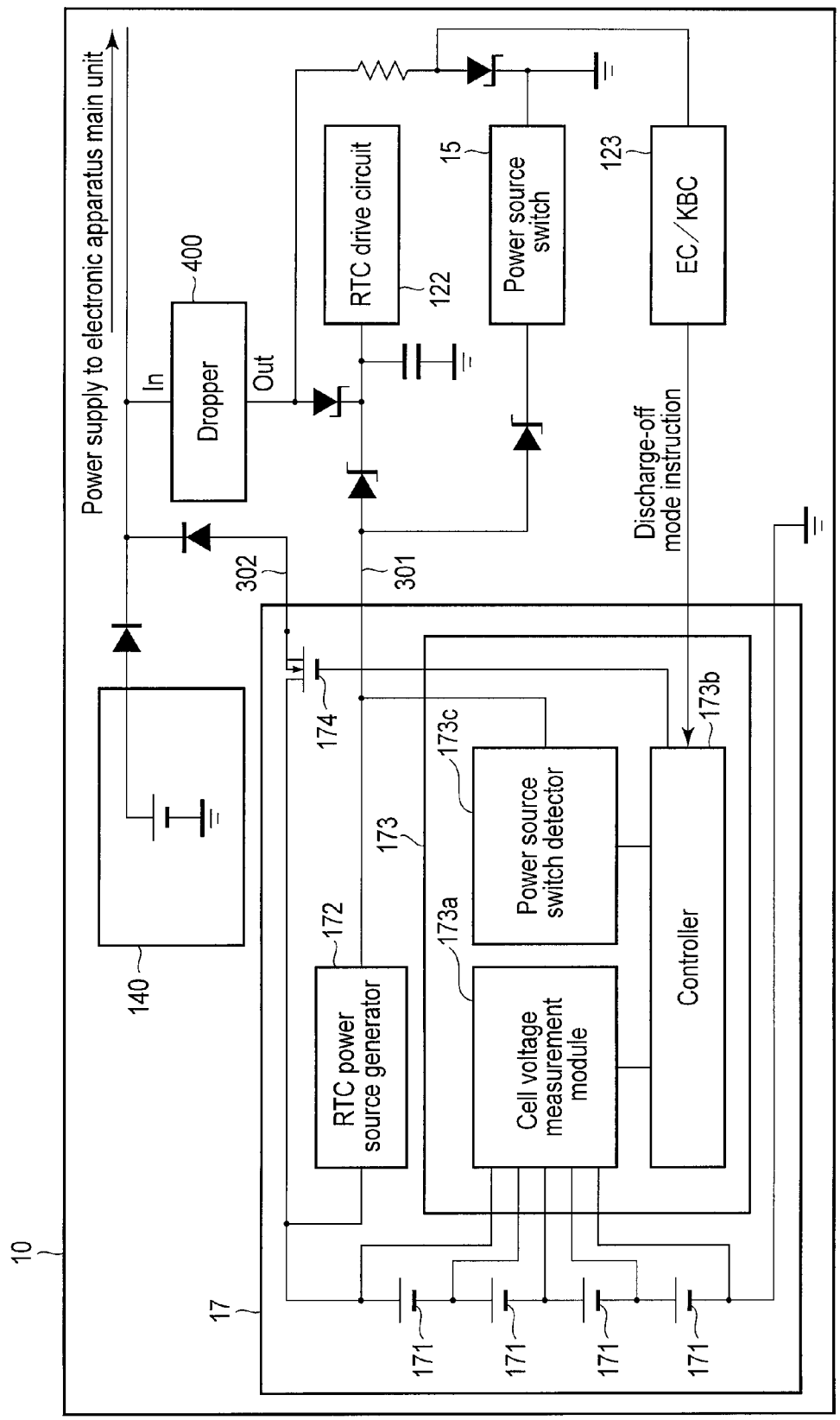
FIG. 7 is diagram showing an example of a mechanism for maintaining power supply to an RTC drive circuit 122.

In this embodiment, the power source switch 15 is connected to the auxiliary power source path 301. Therefore, when the power source switch 15 is pressed, the auxiliary power source path 301 becomes low. Even in this case, a mechanism for maintaining the power supply to the RTC drive circuit 122 shall be added. Specifically, by the structure comprising a dropper 400 as shown in FIG. 7, it is possible to supply a constant voltage to the RTC drive circuit 122 even in a case where, for example, the auxiliary power source path 301 is low.

According to the process shown in the above-described FIG. 6, in order to power on the electronic apparatus 10 (boot the electronic apparatus 10), the power source switch 15 needs to be pressed again after power is supplied to the EC/KBC 123 by the pressing of the power source switch 15. For example, when the power source switch detector 173c notifies the controller 173b that the power source switch 15 is pressed, power-on request information shall be retained inside the power source switch detector 173c. The power-on request information is information indicating that the power source switch 15 is pressed for the purpose of powering on the electronic apparatus 10. The information includes a flag, etc. According to this structure, the EC/KBC 123 to which the power from the battery 17 is supplied can recognize that the power source switch 15 is pressed for the purpose of powering on the electronic apparatus 10 by confirming whether or not the power-on request information is retained inside the power source switch detector 173c. Thus, it is possible to power on the electronic apparatus 10 even without pressing the power source switch 15 again.

In this embodiment, the state of the over-discharge prevention FET 174 is explained as a switched-off state. However, even in a case where the operation mode of the battery 17 is set to the discharge-off mode, the over-discharge prevention FET 174 is switched on (in other words, the main power source path 302 is not blocked) when, for example, none of the voltage values of the battery cells 171 is less than or equal to the voltage threshold value. In this case, when the power source switch 15 is pressed, the EC/KBC 123 can power on the electronic apparatus 10, and the setting of the discharge-off mode may not be cancelled. In this state where the operation mode of the battery 17 is set to the discharge-off mode, the over-discharge prevention FET 174 is switched off when at least one of the voltage values of the battery cells 171 becomes less than or equal to the voltage threshold value after the electronic apparatus 10 is powered on. In this case, for example, although the electronic apparatus 10 is used, the main power source path 302 is blocked, and the operation of the electronic apparatus 10 is stopped. In order to prevent this, as shown in FIG. 8, the gas gage IC 173 may include a current measurement module 173d. The current measurement module 173d is a module configured to measure the current value (discharge current value) in the main power source path 302. According to this structure, even in a case where the operation mode of the battery 17 is set to the discharge-off mode, when a current value that is greater than or equal to the value predetermined (for example, 50 mA) is measured by the current measurement module 173d (in other words, when the electronic apparatus 10 is powered on, and power is supplied to the electronic apparatus main unit 11), the controller 173b can cancel the setting of the discharge-off mode.

According to at least one of the embodiments explained above, it is possible to avoid a situation where the battery 17 which is fully charged is left for a long time, and thus, the deterioration of the battery can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising a battery for supplying power, the apparatus comprising:
   a first path configured to continuously supply power from the battery to a first component to which power needs to be continuously supplied among components constituting the electronic apparatus when a main power source of the electronic apparatus is switched off;
   a second path which is different from the first path and is configured to supply the power from the battery to a second component other than the first component among the components constituting the electronic apparatus when the main power source is switched off, the second component having power consumption larger than the first component;

a setting module configured to set an operation mode of the battery to a discharge-off mode when the main power source is switched off;

a determination module configured to determine whether a state of the battery satisfies a predetermined condition when the operation mode of the battery is set to the discharge-off mode; and a controller configured to shut off the second path when the determination module determines that the condition is satisfied.

2. The electronic apparatus of claim 1, further comprising a measurement module, wherein the battery includes a plurality of battery cells, the measurement module is configured to measure each of voltage values of the plurality of battery cells, and the determination module is configured to determine that the condition is satisfied when at least one of the measured voltage values of the plurality of battery cells is less than or equal to a predetermined value.

3. The electronic apparatus of claim 2, wherein the predetermined value is retained in advance inside the battery.

4. The electronic apparatus of claim 1, further comprising a measurement module configured to measure a remaining capacity of the battery, wherein the determination module is configured to determine that the condition is satisfied when the measured remaining capacity is less than or equal to a predetermined value.

5. The electronic apparatus of claim 4, wherein the predetermined value is retained in advance inside the battery.

6. The electronic apparatus of claim 1, wherein the first component includes an RTC drive circuit configured to drive a real-time clock, and the second component includes a power management controller configured to execute power management of the electronic apparatus.

7. The electronic apparatus of claim 6, further comprising a detector configured to detect an operation for switching on the electronic apparatus when power is not supplied from outside to the electronic apparatus, wherein the controller is configured to cancel the shutoff of the second path when the operation is detected, and the power management controller is configured to power on the electronic apparatus based on power supplied from the battery via the second path by the cancel of the shutoff of the second path.

8. The electronic apparatus of claim 7, further comprising:

a power source button receiving the operation; and a switch connecting the first path and a point of grounding potential in response to the operation relative to the power source button, wherein the detector detects the operation by detecting change in potential of the first path.

9. The electronic apparatus of claim 1, further comprising a measurement module configured to measure a current value in the second path, wherein the controller is configured to cancel the setting of the discharge-off mode when a current value that is greater than or equal to a predetermined value is measured by the measurement module after the discharge-off mode is set.

10. A method executed by an electronic apparatus that comprises a battery for supplying power, a first path configured to continuously supply power from the battery to a first component to which power needs to be continuously supplied among components constituting the electronic apparatus when a main power source of the electronic apparatus is switched off, and a second path which is different from the first path and is configured to supply the power from the battery to a second component other than the first component among the components constituting the electronic apparatus when the main power source is switched off, the second component having power consumption larger than the first component, the method comprising:

setting an operation mode of the battery to a discharge-off mode when the main power source is switched off;

determining whether a state of the battery satisfies a predetermined condition when the operation mode of the battery is set to the discharge-off mode; and shutting off the second path when the condition is determined as being satisfied.

\* \* \* \* \*